(12) United States Patent
Adachi et al.

(10) Patent No.: US 7,318,983 B2
(45) Date of Patent: Jan. 15, 2008

(54) BATTERY

(75) Inventors: Momoe Adachi, Tokyo (JP); Yukio Miyaki, Kanagawa (JP); Hiroshi Imoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 421 days.

(21) Appl. No.: 10/403,199

(22) Filed: Mar. 31, 2003

(65) Prior Publication Data
US 2004/0009402 A1 Jan. 15, 2004

(30) Foreign Application Priority Data
Apr. 4, 2002 (JP) ............................ P2002-102883

(51) Int. Cl.
*H01M 4/74* (2006.01)
(52) U.S. Cl. .................. 429/241; 429/234; 429/233; 429/218.1
(58) Field of Classification Search ............. 429/218.1, 429/233, 234, 241
See application file for complete search history.

(56) References Cited

U.S. PATENT DOCUMENTS

| | | | | |
|---|---|---|---|---|
| 4,812,376 A | * | 3/1989 | Rudolph | ..................... 429/213 |
| 5,185,221 A | * | 2/1993 | Rampel | ........................ 429/59 |
| 5,460,904 A | * | 10/1995 | Gozdz et al. | ................ 429/254 |
| 6,699,623 B1 | * | 3/2004 | Dai | ............................ 429/245 |
| 2003/0099884 A1 | * | 5/2003 | Chiang et al. | ............... 429/233 |

FOREIGN PATENT DOCUMENTS

JP     04-004563     1/1992

* cited by examiner

*Primary Examiner*—Laura Weiner
(74) *Attorney, Agent, or Firm*—Sonnenschein Nath & Rosenthal LLP

(57) ABSTRACT

The invention provides a battery achieving excellent battery characteristics by using, as an anode active material, any of metal elements and metalloid elements each of which can form an alloy with a lithium, alloys of these elements, and compounds of these elements. Mesh projections as a frame structure are formed on the surface on the side facing an anode active material layer, of an anode collector. By the mesh projections, expansion and contraction in the plane direction of the anode active material layer is suppressed. Thus, pulverization, peeling, and the like of the anode active material layer caused by expansion and contraction thereof are prevented and the cycle characteristics are improved.

8 Claims, 3 Drawing Sheets

U S 7,318,983 B2

BATTERY

RELATED APPLICATION DATA

The present application claims priority to Japanese Application(s) No(s). P2002-102883 filed Mar. 31, 2002, which application(s) is/are incorporated herein by reference to the extent permitted by law.

BACKGROUND OF THE INVENTION

1. Field of the Invention

The present invention relates to a battery using, as an anode active material, any of metal elements or metalloid elements each of which can form an alloy with a light metal such as lithium (Li), alloys of these elements, and compounds of these elements.

2. Description of the Related Art

In recent years, as electron technologies advance, increase in performance, miniaturization, and portability of electronic devices are being vigorously improved. In association with the improvements, researches of a rechargeable secondary battery as a power source which can be used conveniently and economically for long time are being conducted. Hitherto, secondary batteries such as a lead battery, an alkaline battery, a lithium ion secondary battery, and the like are widely known. Among them, attention is paid to a lithium ion secondary battery as a battery capable of realizing high output and high energy density.

In a lithium ion secondary battery, conventionally, a carbonaceous material such as non-graphitizable carbon or graphite is widely used as an anode active material. Although the carbonaceous materials exhibit relatively high capacity and excellent cycle characteristic, in association with increase in capacity in recent years, a higher capacity is demanded, and research is being conducted. For example, Japanese Unexamined Patent Application No. 8-315825 discloses a technique of increasing the capacity by selecting a carbonaceous material and manufacturing conditions. According to the technique, however, the discharge potential of an anode with respect to lithium is 0.8 V to 1.0 V. Since the battery discharge voltage when a battery is constructed becomes lower, it is difficult to largely improve the energy density. Further, a charge/discharge curve shows a large hysteresis and there is a problem such that the energy efficiency in each charge/discharge cycle is low.

On the other hand, as other anode active materials, lithium alloys applied to be reversibly generated/decomposed electrochemically have been widely studied. The lithium alloys include Li—Al alloys, and Si alloys disclosed in U.S. Pat. No. 4,950,566.

The Li—Al alloy and Li—Si alloy expand/contract in association with charge/discharge much more than the carbonaceous materials. Consequently, as the charge/discharge cycle repeats, the anode is pulverized, and it causes a problem such that the cycle characteristic is extremely low. To improve the cycle characteristic, therefore, methods of adding an element which is not involved in expansion/contraction with doping/undoping of lithium into/from lithium alloy have been examined. For example, Japanese Unexamined Patent Application No. 6-325765 proposes $Li_xSiO_y$ ($x \geq 0$, $2>y>0$), Japanese Unexamined Patent Application No. 7-230800 proposes $Li_xSi_{1-y}M1_yO_z$ ($x \geq 0$, $1>y>0$, $0<z<2$, where M1 denotes a metal element such as Ti, W, or Mn), and Japanese Unexamined Patent Application No. 7-288130 proposes an Li—Ag—Te alloy. However, even if the methods are employed, it is difficult to suppress deterioration in cycle performance due to expansion/contraction which occurs in association with charge/discharge and, in actual circumstances, the advantage of high capacity of a lithium alloy is not fully utilized.

Japanese Unexamined Patent Application No. 11-120705 reports a high-capacity anode using a 4B group compound except for carbon, containing one or more nonmetal elements. The problem of deterioration in the charge/discharge cycle performance is not solved also by the reported technique.

SUMMARY OF THE INVENTION

The invention has been achieved in consideration of the problems and its object is to provide a battery capable of achieving excellent cycle characteristic by using, as an anode active material, a metal element which can form an alloy with a light metal such as lithium, a metalloid element which can form an alloy with a light metal such as lithium, or an alloy of these elements or a compound of these elements.

A battery according to the invention comprises a cathode, an anode, and an electrolyte, wherein the anode comprises: an anode active material layer containing at least one element selected from the group of metal elements or metalloid elements each of which can form alloy with a light metal, alloys of these elements, and compounds of these elements; and a mesh structure upon which the anode active material layer is formed, the mesh structure effective to suppress expansion and contraction of the anode active material layer.

In the battery according to the invention, although the anode active material layer expands/contracts in association with charge/discharge, the expansion/contraction in the plane direction of the anode active material layer is suppressed by the mesh structure. Thus, pulverization, peeling, and the like of the anode active material layer due to expansion and contraction thereof are prevented, and the cycle characteristics are improved.

Other and further objects, features and advantages of the invention will appear more fully from the following description.

DETAILED DESCRIPTION OF THE PREFERRED EMBODIMENTS

An embodiment of the invention will be described in detail hereinbelow with reference to the drawings.

Figure 1:
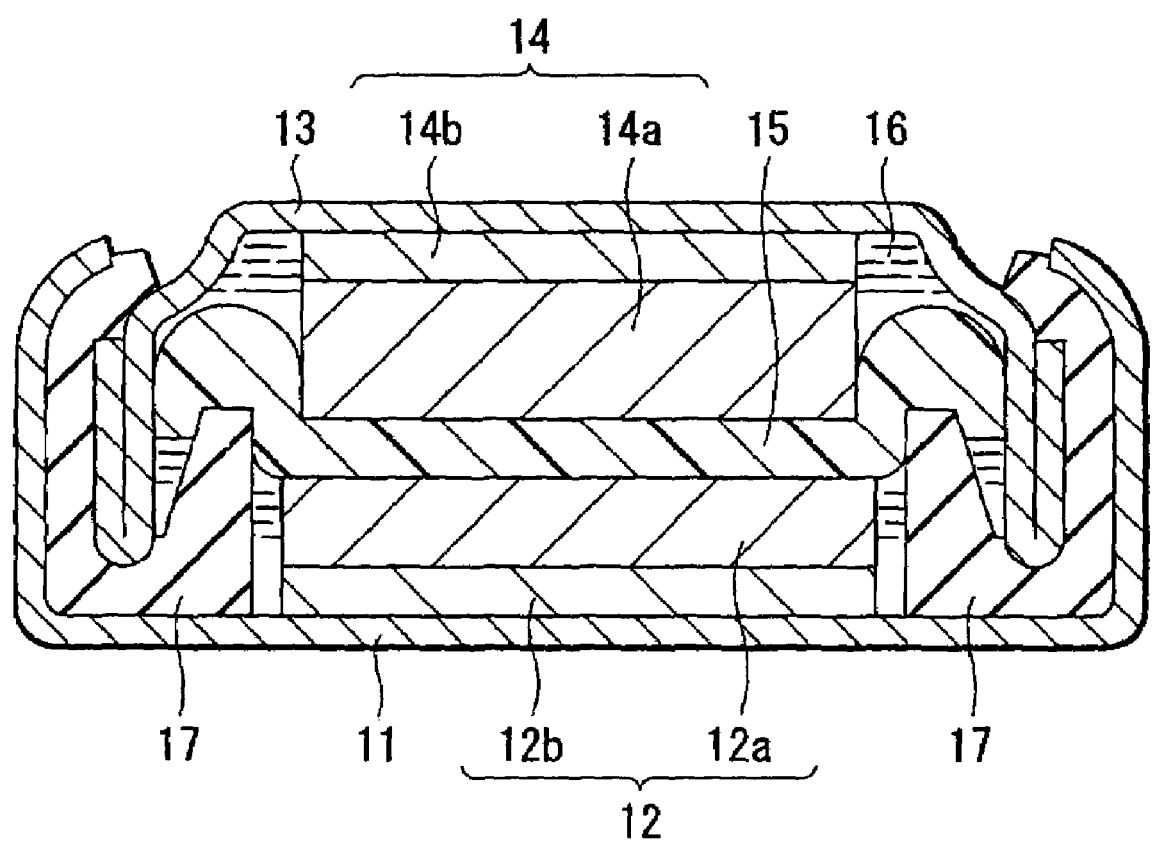
FIG. 1 is a cross section showing the configuration of a secondary battery according to an embodiment of the invention.

FIG. 1 shows a sectional structure of a secondary battery according to an embodiment of the invention. The secondary battery is what is called of a coin type. A disc-shaped cathode 12 housed in an armor can 11 and a disc-shaped anode 14 housed in an armor cup 13 are disposed so as to face each other sandwiching a separator 15 in between. The armor can 11 and armor cup 13 are filled with an electrolytic solution 16 as a liquid electrolyte. The peripheral portions of the armor can 11 and armor cup 13 are caulked via a gasket 17 so as to be sealed. Each of the armor can 11 and armor cup 13 is made of, for example, a metal such as stainless steel or aluminum (Al).

The cathode 12 has, for example, a cathode active material layer 12a disposed on the anode 14 side and a cathode collector 12b disposed on the side of the armor can 11 so as to be in contact with the armor can 11. The cathode collector 12b is constructed by metal foil such as aluminum foil, nickel foil, or stainless steel foil.

The cathode active material layer 12a contains as a cathode active material, for example, one or more of cathode materials capable of inserting and extracting lithium as a light metal and, as necessary, a conductive agent such as graphite and a binder such as polyvinylidene fluoride. Examples of cathode materials capable of inserting and extracting lithium are metallic sulfides or oxides and the like which do not contain lithium such as $TiS_2$, $MoS_2$, $NbSe_2$, and $V_2O_5$, lithium-contained compounds such as lithium oxides, lithium sulfides, and interlayer compounds containing lithium, and high polymer materials.

Particularly, to increase energy density, a lithium composite oxide expressed by a general formula of $Li_aM2O_2$ or an interlayer compound containing lithium is preferable. M2 denotes one or more kinds of transition metals and preferably, for example, one or more metals selected from the group of cobalt (Co), nickel, and manganese (Mn). "a" varies according to a charge/discharge state of a battery and is usually a value in the range of $0.05 \leq a \leq 1.10$. Concrete examples of the lithium composite oxides are $LiCoO_2$, $LiNiO_2$, $Li_bNi_cCo_{1-c}O_2$ (b and c vary according to the charge/discharge state of a battery and are values in the range of $0<b<1$ and $0.7<c<1.02$, respectively) or $LiMn_2O_4$ having a spinel structure.

The anode 14 has, for example, an anode active material layer 14a disposed on the side of the cathode 12 and an anode collector 14b disposed on the side of the armor cup 13 so as to be in contact with the armor cup 13.

The anode active material layer 14a contains as an anode active material, for example, at least one or more materials selected from the group of metal elements and metalloid elements each of which can form an alloy with a lithium as a light metal, alloys of these elements, and compounds of these elements, and may contain, as necessary, a binder such as polyvinylidene fluoride. The elements and their alloys and compounds are preferable as the anode active materials since they can obtain high energy density. In the specification, the alloys include not only an alloy made by two or more metal elements but also an alloy made of one or more metal elements and one or more metalloid elements. The structure of an alloy is a solid solution, a eutectic (eutectic mixture), an intermetallic compound, or a mixture of two or more of them.

Examples of such metal elements and metalloid elements are tin (Sn), lead (Pb), aluminum, indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), and hafnium (Hf). An alloy or compound of any of the elements is expressed by, for example, a chemical formula of $Ma_sMb_t Li_u$ or $Ma_pMc_qMd_r$. In the chemical formulae, Ma indicates at least one kind of metal elements and metalloid elements each capable of forming an alloy in cooperation with lithium, Mb denotes at least one of metal elements and metalloid elements other than lithium and Ma, Mc indicates at least one of non-metallic elements, and Md indicates at least one of metal elements and metalloid elements other than Ma. The values of s, t, u, p, q, and r satisfy $s>0$, $t \geq 0$, $u \geq 0$, $p>0$, $q>0$, and $r \geq 0$, respectively.

Particularly, 4B group metal elements and metalloid elements and alloys and compounds of these elements are preferable. More preferable elements are silicon and tin and their alloys and compounds. The most preferable are silicon and its alloys and compounds. The materials may be crystalline or amorphous ones.

Concrete examples of the alloys and compounds are LiAl, Li—AlM3 (M3 is one or more of 2A, 3B, and 4B transition metal elements), AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $Ge_2N_2O$, $SiO_v$ ($0<v \leq 2$), $SnO_w$ ($0<w \leq 2$), $SnSiO_3$, LiSiO, and LiSnO.

The anode active material layer 14a preferably contains, as the anode active material or conductive agent, a carbonaceous material or conductive high polymer material in order to improve conductivity of the anode 14. The carbonaceous material and conducive high polymer material can insert and extract lithium or cannot insert and extract lithium. In the case where the materials can insert and extract lithium, they function as an anode active material and a conductive agent. In the case where the materials cannot insert and extract lithium, they function as a conductive agent.

Examples of the carbonaceous material are non-graphitizable carbon, artificial graphite, natural graphite, pyrolytic carbons, cokes, graphites, glass carbons, organic high polymer compound firing body, carbon fibers, active carbons, and carbon blacks. The cokes include pitch coke, needle coke, and petroleum coke. The organic high polymer compound firing body is obtained by firing a high polymer material such as phenol resin or furan resin at a proper temperature and carbonizing the fired resultant. Examples of the conductive high polymer materials are n-type conductive high polymer materials such as polyacetylene, polyparaphenylene, and polythiophene.

In the case of using, as an anode active material, a mixture of any of the metal elements and metalloid elements each of which can form an alloy with a lithium and their alloys and compounds and any of the above-described other materials, the mass ratio of any of the metal elements and metalloid elements each of which can form an alloy with a lithium and their alloys and compounds is preferably 5% or higher in the anode active material contained in the anode 14. If the ratio of any of the elements and their alloys and compounds is low, the energy density cannot be increased high enough.

Figure 2:
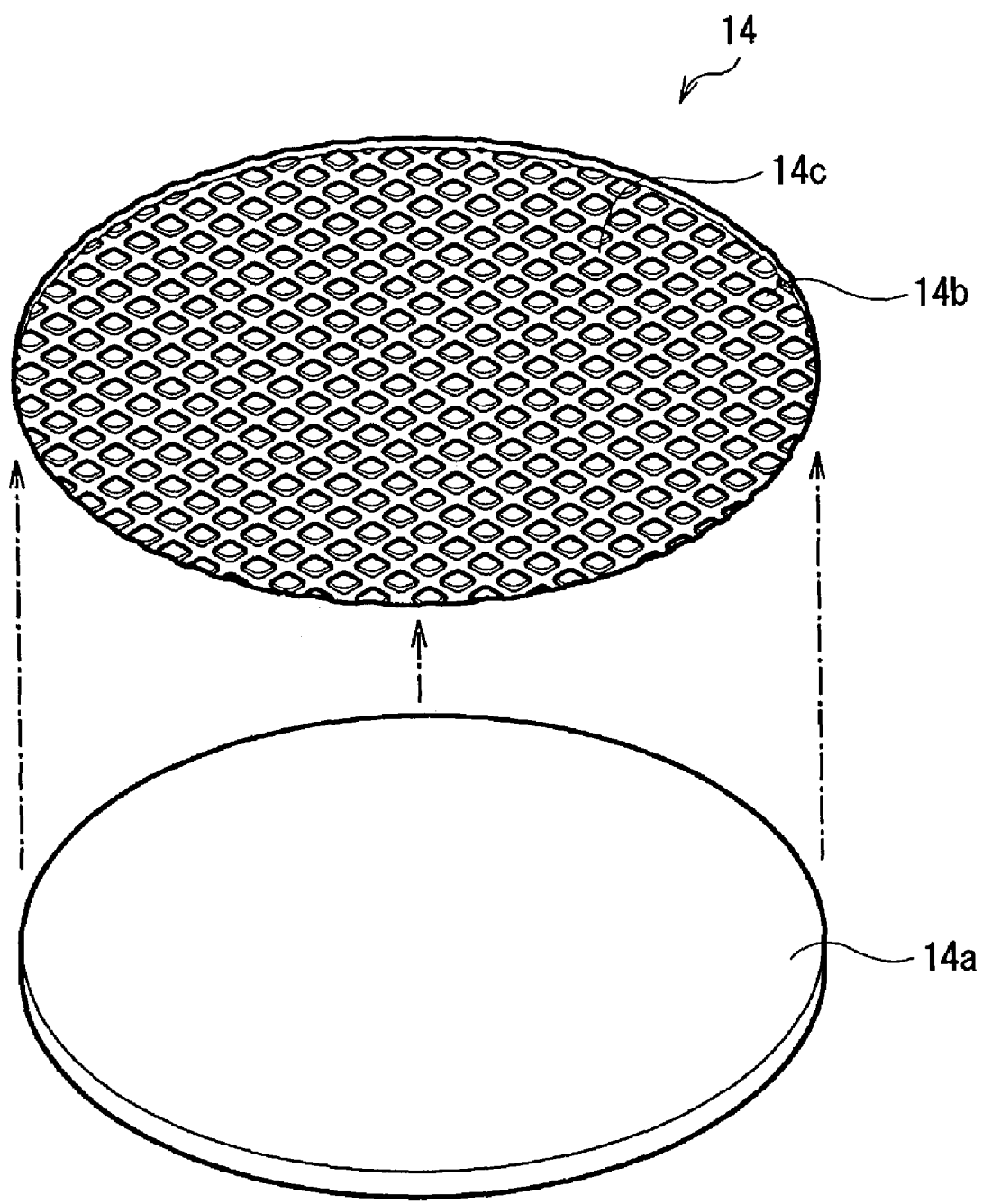
FIG. 2 is an exploded perspective view showing an example of the configuration of an anode illustrated in FIG. 1.

The anode collector 14b is a mesh structure which is used to suppress expansion and contraction of the anode active material layer 14a. Preferably, the mesh structure has, for example as shown in FIG. 2, mesh projections 14c on the surface on the side opposite to the anode active material layer 14a. Although not shown, a mesh structure having as a mesh configuration and, for example, a mesh structure at least partially having a mesh configuration are also preferred. By employing such a structure, expansion and contraction in the plane direction of the anode active material layer 14a can be suppressed. The mesh projections 14c may be formed directly by, for example, rolling or may be formed by combining a foil member 14d and a mesh member 14e as shown in FIG. 3.

Figure 3:
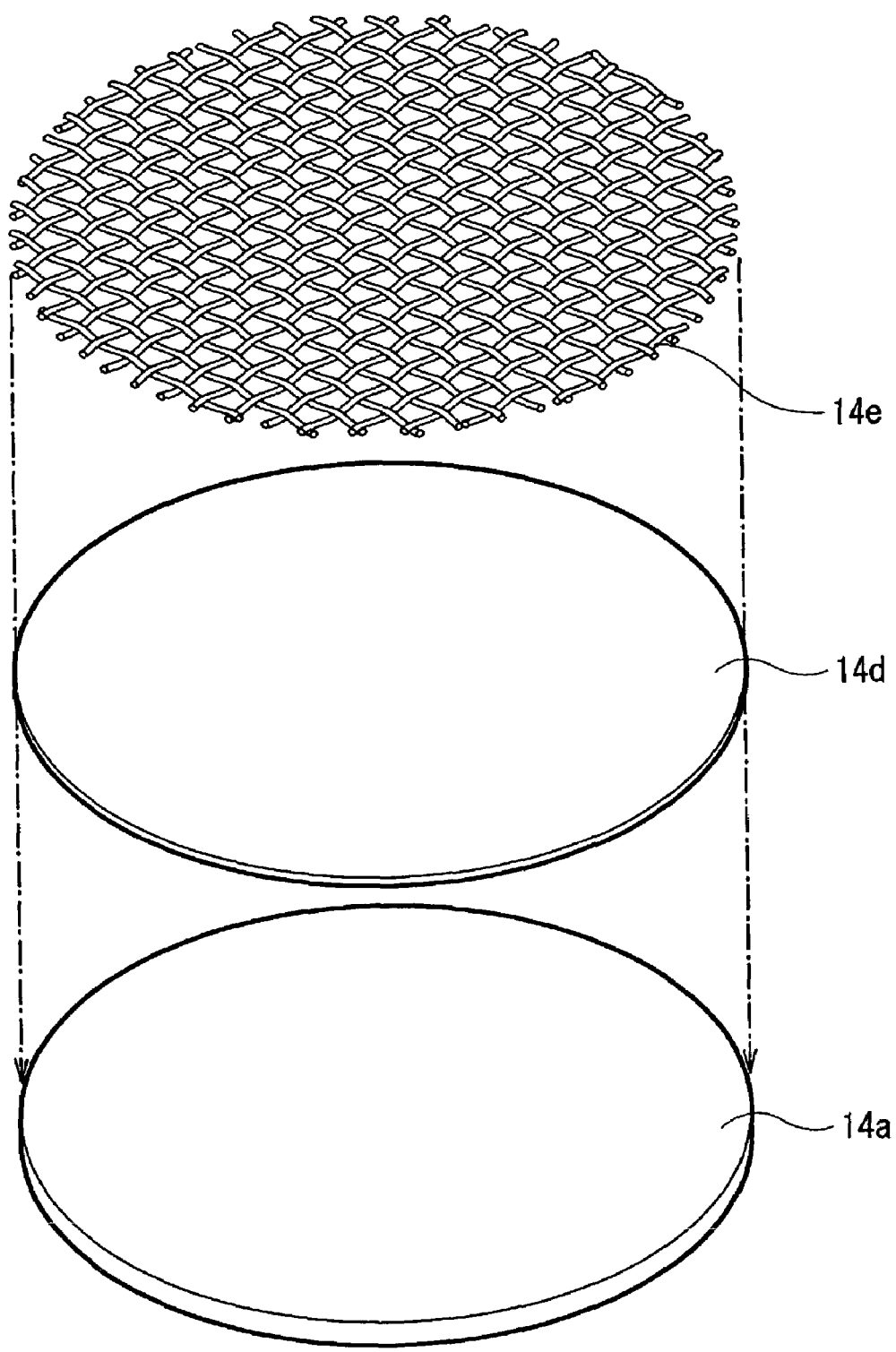
FIG. 3 is an exploded perspective view showing an example of an anode collector illustrated in FIG. 2.

The mesh member 14e may be obtained by alternately passing thin metal lines made of nickel, stainless steel or the like under each other so as to cross each other in the vertical and lateral directions as shown in FIG. 3, that is, weaving the thin metal lines or interlacing such thin metal lines. When the thickness is the same, nickel is preferable since a thin metal line made of nickel is harder than a thin metal line made of stainless steel so that a weave texture or mesh is not easily deformed and high effects are produced. The mesh member 14e may be, for example, an expand metal obtained by making a number of incisions in metal foil and pulling the metal foil to both directions to thereby form a number of rhombus holes. The mesh member 14e may be also obtained by punching a number of holes in metal foil.

The size of a mesh of the mesh projections 14c, that is, the maximum length of an opening in the mesh is preferably equal to or larger than 1/400 inch and smaller than 1/4 inch (equal to or larger than 2.54/400 cm and smaller than 2.54/4 cm). Particularly, when the mesh member 14e is obtained by weaving or interlacing metal thin lines, the size is preferably equal to or larger than 400 meshes and smaller than 4 meshes. The definition of "mesh" here is a unit indicative of the size of an opening in the mesh and denotes "the number of openings in length of 1 inch". Within the range, the expansion and contraction of the anode active material layer 14a can be suppressed more efficiently. As long as the size is within the range, the shape of the mesh projections 14c is not limited to a lattice including almost square openings as shown in FIG. 2 but may be a triangle, rhombus, hexagon, or the like.

The separator 15 is used to isolate the cathode 12 and the anode 14 from each other and pass lithium ions while preventing short-circuiting of current caused by contact of the electrodes. The separator 15 is made by, for example, a porous film made of a synthetic resin such as polytetrafluoroethylene, polypropylene, or polyethylene or a porous film made of an inorganic material such as nonwoven fabric made of ceramics. The separator 15 may have a structure obtained by stacking two or more kinds of such porous films.

The electrolytic solution 16 is obtained by dissolving lithium salt as an electrolyte salt into a solvent and exhibits ion conductivity when the lithium salt is ionized. Proper lithium salts are $LiPF_6$, $LiClO_4$, $LiAsF_6$, $LiBF_4$, $LiCF_3SO_3$, $LiN(CF_3SO_2)_2$, $LiN(C_2F_5SO_2)_2$, $LiC(CF_3SO_2)_3$ and $LiC_4F_9SO_3$. One of the lithium salts or a mixture of two or more of the lithium salts is used. The salt concentration of the electrolyte is preferably in the range from 0.1 to 2.0 mol/l or 0.1 to 2.0 mol/kg so as to obtain excellent ion conductivity.

Preferable solvents are nonaqueous solvents such as propylene carbonate, ethylene carbonate, γ-butyrolactone, sulfolane, 1,2-dimethoxyethane, 1,2-diethoxyethane, 2-methyltetrahydrofuran, dimethyl carbonate, diethyl carbonate, tetrahydrofuran, 1,3-dioxolane, 4 methyl 1,3-dioxolane, diethyl ether, methyl sulfolane, acetonitrile, propionitrile, anisole, ester acetate, ester butyrate, and ester propionate. One of them or a mixture of two or more of them is used.

This secondary battery can be produced as follows for example.

First, for instance, a cathode mixture is prepared by mixing the cathode active material, a conductive agent, and a binder and is compression-molded with the cathode collector 12b to form a pellet form, thereby forming the cathode active material 12a and producing the cathode 12. It is also possible to add a solvent such as N-methyl-2-pyrrolidone to the cathode mixture to thereby obtain a cathode mixture slurry, apply the cathode mixture slurry on the cathode collector 12b, dry the slurry, and compression-mold the slurry.

Subsequently, for example, powders of at least one of the metal elements or metalloid elements each capable of forming an alloy with a lithium and alloys and compounds of these elements are prepared as an anode active material. An anode mixture is prepared by mixing at least one of the metal elements and metalloid elements and their alloys and compounds, a binder and, as necessary, other anode active materials or a conductive agent. The anode mixture is compression-molded with the anode collector 14b to form a pellet form, thereby forming the anode active material layer 14a, and the anode 14 is fabricated. In a manner similar to the cathode active material layer 12a, it is also possible to add a solvent such as N-methyl-2-pyrrolidone to the anode mixture to thereby obtain an anode mixture slurry, apply the anode mixture slurry on the anode collector 14b, dry the slurry, and compression-mold the slurry.

Each of the metal elements and metalloid elements each capable of forming an alloy with a lithium, and alloys and compounds of these elements can be produced by, for example, a mechanical alloying method or a method of mixing material compounds and heating the mixture in inert atmosphere or reducing atmosphere. In the case of grinding the elements and their alloys and compounds, it is sufficient to perform grinding so that the maximum particle after grinding becomes smaller than the thickness of the applied anode active material layer 14a. Any method such as ball mill grinding or jet mill grinding may be employed. To obtain target effects, the average particle diameter (volume average particle diameter) is preferably 50 μm or less and, more preferably, 20 μm or less.

In the case of using the elements and their alloys and compounds without grinding, the anode active material layer 14a may be formed as a mold of the elements and their alloys and compounds by chemical vapor deposition, sputtering, hot press method, or the like.

A lithium may be electrochemically doped into any of the elements and their alloys and compounds in a battery after the battery is formed. A lithium may be supplied from the cathode 12 or a lithium source other than the cathode 12 and electrochemically doped before or after formation of the battery. Alternately, a lithium may be mixed into a material, thereby obtaining a lithium-contained material, and the lithium-contained material may be contained in the anode 14 at the time of forming the battery.

In the case of using, as the anode collector 14b, a structural member obtained by combining the foil member 14d and the mesh member 14e, for example, the anode 14 may be produced by forming the anode active material layer 14a on the foil member 14d, placing the mesh member 14e on the foil member 14d, and applying a pressure to the mesh member 14e. Alternately, after combining the foil member 14d and the mesh member 14e, the anode active material layer 14a may be formed. In such a case, since the foil member 14d is very thin metal foil, the shape of the mesh member 14e which is pressed against one of the faces of the foil member 14d or combined to the foil member 14d is transferred to the face on the opposite side, thereby forming the mesh projections 14c.

After that, for example, the cathode 12, separator 15, and anode 14 are stacked in this order. The resultant is put into the armor can 11, the electrolytic solution 16 is injected into the armor can 11 and, after that, the armor can 11 and the armor cup 13 are caulked via a gasket 17. In such a manner, the secondary battery shown in FIG. 1 is formed.

It is not always necessary to supply a lithium existing in the battery system all from the cathode 12 or anode 14. The lithium may be electrochemically doped into the cathode 12 or anode 14 in a process of manufacturing an electrode or battery.

The secondary battery acts as follows.

When the secondary battery is charged, for example, lithium ions are extracted from the cathode 12 and inserted into the anode 14 via the electrolytic solution 16. When the secondary battery is discharged, for example, the lithium ions are extracted from the anode 14 and inserted into the cathode 12 via the electrolytic solution 16. In association with the charge/discharge, the anode active layer 14a expands and contracts. However, the anode collector 14b is constructed by a structural member having a frame structure, so that expansion and contraction in the plane direction of the anode active material layer 14a is suppressed by the frame structure. Therefore, pulverization, peeling, and the like of the anode active material layer 14a due to expansion and contraction thereof can be prevented, so that the cycle characteristic can be improved.

In the battery of the embodiment, the anode collector 14b is constructed by the structural member having the frame structure. Consequently, by using, as the anode active material, at least one element selected from the group of the metal elements and metalloid elements each of which can form an alloy with a lithium, and their alloys and compounds, expansion and contraction in the plane direction of the anode active material layer 14a, which occurs in association with charge and discharge can be suppressed. Thus, pulverization, peeling, and the like of the anode active material layer 14a caused by expansion and contraction thereof can be prevented, and the cycle characteristic can be improved.

EXAMPLES

Further, a concrete example of the invention will be described in detail with reference to FIGS. 1 to 3 by using the same reference numerals.

First, lithium carbonate ($Li_2CO_3$) and cobalt carbonate ($CoCO_3$) were mixed at a mole ratio of $Li_2CO_3$:$CoCO_3$=0.5:1. The mixture was fired at 900° C. for 5 hours in the air, thereby obtaining a lithium/cobalt composite oxide ($LiCoO_2$) as a cathode active material. Subsequently, 91 parts by mass of the lithium/cobalt composite oxide, 6 parts by mass of graphite as a conductive agent, and 3 parts by mass of polyvinylidene fluoride as a binder were mixed, thereby preparing a cathode mixture. After that, the cathode mixture was dispersed in N-methyl-2-pyrrolidone as a solvent, thereby obtaining a cathode mixture slurry. The cathode mixture slurry was uniformly applied on one of the faces of the cathode collector 12b made of aluminum foil in a strip shape having a thickness of 20 μm, dried, compression molded by a roller press, and punched into a pellet having a diameter of 15.5 mm. In such a manner, the cathode active material layer 12a was formed, and the cathode 12 was fabricated.

$Mg_2Si$ as an anode active material was ground so that the average particle diameter became 15 μm. Further, artificial graphite powders were prepared as an anode active material and a conductive agent, and 50 parts by mass of $Mg_2Si$ powders, 40 parts by mass of the artificial graphite powders and 10 parts by mass of polyvinylidene fluoride as a binder were mixed, thereby preparing an anode mixture. The anode mixture was dispersed in N-methyl-2-pyrrolidone as a solvent to obtain an anode mixture slurry. After that, the anode mixture slurry was uniformly applied on one of the faces of the foil member 14d made of copper foil in a strip shape having a thickness of 15 μm, dried, compression-molded by a roller press, and punched into a pellet having a diameter of 16 mm, thereby forming the anode active material layer 14a.

Subsequently, the mesh member 14e is placed on the foil member 14d and a proper pressure is applied (refer to FIG. 3), thereby forming the anode collector 14b having the mesh projections 14c on the side facing the anode active material layer 14a. As the mesh member 14e, a mesh obtained by weaving thin metal lines of nickel was used. The size of an opening in the mesh member 14e, that is, the size of the mesh projections 14c was set to 40 meshes. In such a manner, the anode 14 was fabricated.

After that, the separator 15 made by a microporous polypropylene film having a thickness of 25 μm was prepared. The cathode 12, separator 15, and anode 14 were stacked in this order and the stacked body was inserted in the armor can 11. After that, the electrolytic solution 16 was injected. As the electrolytic solution 16, a solution obtained by dissolving $LiPF_6$ as an electrolyte salt into a solvent so that the content of $LiPF_6$ becomes 1.0 mol/l was used. The solvent was obtained by mixing ethylene carbonate and diethyl carbonate at a mass ratio of ethylene carbonate: diethyl carbonate=1:1. Then the armor can 11 and the armor cup 13 were caulked via the gasket 17 so as be sealed. In such a manner, the coin-shaped secondary battery having a diameter of 20 mm and a height of 2.5 mm as shown in FIG. 1 was fabricated.

As a comparative example to be compared with the example, except that the mesh member 14e is not pressed so that the mesh projections 14c are not formed in the anode collector 14b, a secondary battery was fabricated in a manner similar to the example.

Further, as Reference Example 1, except that 90 parts by mass of natural graphite were used as the anode active material in place of 50 parts by mass of the $Mg_2Si$ powders and 40 parts by mass of artificial graphite powders, a secondary battery was fabricated in a manner similar to the example.

Further, as Reference Example 2, except that 90 parts by mass of natural graphite were used as the anode active material in place of 50 parts by mass of the $Mg_2Si$ powders and 40 parts by mass of artificial graphite powders, a secondary battery was fabricated in a manner similar to the example.

A charge/discharge test was conducted on the obtained secondary batteries of the example, the comparative example, and Reference Examples 1 and 2 to check the discharge capacity of the 100th cycle when the discharge capacity of the first cycle is set to 100. Charging with a constant current and constant voltage of 1 mA at 20° C. was performed up to 4.2 V of the upper limit and discharging with a constant current of 1 mA was performed up to 2.5 V of the final voltage. The charge/discharge was repeated 100 cycles under the same conditions. Table 1 shows the results. The discharge capacity of the first cycle in the example and that in the comparative example are equal to each other. When the discharge capacity of the first cycle is converted to the capacity per unit volume of the anode 14, it is about 1.85 times as large as that of each of Reference Examples 1 and 2.

TABLE 1

| | Active material of anode | Mesh projections | Discharge capacity maintenance rate in the 100th cycle (%) |
|---|---|---|---|
| Example | Mg$_2$Si, artificial graphite | present | 86.2 |
| Comparative example | Mg$_2$Si, artificial graphite | absent | 80.1 |
| Reference Example 1 | natural graphite | present | 95.1 |
| Reference Example 2 | natural graphite | absent | 95.2 |

As understood from Table 1, the discharge capacity maintenance rate of the 100th cycle of the example in which the mesh projections 14c are provided is higher than that of the comparative example in which the mesh projections 14c are not provided. In contrast, in Reference Examples 1 and 2 using only natural graphite as the anode active material, no improvement in the discharge capacity maintenance rate by the mesh projections 14c was found. The battery was decomposed after 100 cycles and the anode 14 was observed. The anode active material layer 14a of the comparative example was come off from the anode collector 14b in many parts. In contrast, such a phenomenon was not seen in the anode active material layer 14a of the example. It was understood that by providing the mesh projections 14c in the case of using, as the anode active material, at least one element selected from the group of the metal elements and metalloid elements each of which can form an alloy with a lithium, and their alloys and compounds, the discharge capacity and the cycle characteristic can be improved.

Although the invention has been described by the embodiment and example, the invention is not limited to the embodiment and examples but can be variously modified. For example, although the mesh projections 14c are provided as a frame structure for the anode collector 14b to suppress expansion and contraction of the anode active material layer 14a in the foregoing embodiment and examples, the mesh projections 14c as the frame structure are not limited to be provided for the anode collector 14b. For example, a structural member having mesh projections as a frame structure may be prepared separately from the anode collector 14b to suppress expansion and contraction of the anode active material layer 14a by the structural member. Alternately, it is also possible to omit the anode collector 14b and to provide the armor cup 13 with the mesh projections 14c to suppress expansion and contraction of the anode active material layer 14a.

Although the case of using an electrolytic solution as a liquid electrolyte has been described in the foregoing embodiment and example, other electrolytes may be used. Examples of the other electrolytes are a gel electrolyte in which an electrolytic solution is held by a high polymer compound, an organic solid electrolyte in which an electrolyte salt is dispersed in a high polymer compound having ion conductivity, an inorganic solid electrolyte made of ionic conductive ceramics, ionic conductive glass, ionic crystal, or the like, a mixture of any of the inorganic solid electrolytes and an electrolytic solution, and a mixture of any of the inorganic solid electrolytes and a gel electrolyte or organic solid electrolyte. Examples of the inorganic solid electrolyte are lithium nitride and lithium iodide.

Examples of the high-polymer compound of the gel electrolyte are polyvinylidene fluoride and a copolymer of polyvinylidene fluoride. Examples of monomers of the copolymer are hexafluoropropylene and tetrafluoroethylene.

Except for the above, polyacrylonitrile and a copolymer of polyacrylonitrile can be used as high polymer compounds. Examples of a vinyl monomer as a copolymer monomer are vinyl acetate, methyl methacrylate, butyl methacrylate, methyl acrylate, butyl acrylate, itaconic acid, hydrogenated methyl acrylate, hydrogenated ethyl acrylate, acrylamide, vinyl chloride, vinylidene fluoride, and vinylidene chloride. Other examples are acrylonitrile-butadiene rubber, acrylonitrile-butadiene-styrene resin, acrylonitrile-polyethylene chloride-propylene dien styrene resin, acrylonitrile-vinyl chloride resin, acrylonitrile methacrylic resin, and acrylonitrile acrylate resin.

As a high polymer compound, polyethylene oxide or a copolymer of polyethylene oxide may be also used. Examples of the copolymer monomer are polypropylene oxide, methyl methacrylate, butyl methacrylate, methyl acrylate, and butyl acrylate. Other examples are polyether modified siloxane and a copolymer of polyether modified siloxane.

To form an excellent gel state, the content of the high polymer compound is preferably in the range from 5 percent by mass to 50 percent by mass to the electrolytic solution.

It is sufficient for the gel electrolyte to exhibit ion conductivity of 1 mS/cm or higher at room temperature. The gel electrolyte includes, for example, a high polymer solid electrolyte obtained by swelling a high polymer compound with an electrolytic solution. Examples of the high polymer compounds in this case are polyethylene oxide, polypropylene oxide, polyphosphagen and polysiloxane.

Although the case in which lithium is inserted and extracted in the anode 14 has been described in the foregoing embodiment and example, the invention can be also similarly applied to the case where lithium is inserted and extracted, and is also deposited and dissolved in the anode 14. Specifically, the invention is also applied to a battery in which capacity of the anode 14 is expressed by the sum of a capacity component determined by insertion and extraction of a light metal and a capacity component determined by deposition and dissolution of a light metal, and the light metal is deposited on the anode 14 during charging.

Although the case where a lithium is used as a light metal has been described in the foregoing embodiment and example, the invention can be also applied to the case of using other alkali metal such as sodium (Na) or potassium (K), alkaline earth metal such as magnesium or calcium (Ca), other light metal such as aluminum, a lithium, or an alloy of any of the materials. In this case, a cathode active material, an anode active material, a nonaqueous solvent, an electrolyte salt, and the like are selected according to the light metal.

Furthermore, although a secondary battery has been described as a concrete example in the foregoing embodiment and example, the invention can be also similarly applied to other batteries such as a primary battery.

As described above, the battery according to the invention comprises the structural material which has the frame structure and suppresses expansion and contraction of the anode active material layer. Consequently, by using, as the anode active material, at least one element selected from the group of the metal elements and metalloid elements each of which can form alloy with a light metal, and their alloys and compounds, expansion and contraction of the anode active material layer in the plane direction thereof can be suppressed. Thus, pulverization, peeling, and the like of the anode active material layer caused by expansion and contraction thereof can be prevented, so that the cycle characteristic can be improved.

Obviously many modifications and variations of the present invention are possible in the light of the above teachings. It is therefore to be understood that within the scope of the appended claims the invention may be practiced other wise than as specifically described.

What is claimed is:

1. A battery comprising:
   a cathode;
   an anode;
   an electrolyte; and
   a separator separating the anode and the cathode, wherein the anode comprises
   (a) an anode active material layer containing at least one element selected from the group consisting of metal elements which can form an alloy with a light metal, metalloid elements which can form an alloy with a light metal, alloys of these elements, and compounds of these elements; and
   (b) a mesh structure upon which the anode active material layer is formed, the mesh structure having mesh projections projecting toward and compressed into a surface of the anode active material layer, the mesh structure effective to suppress expansion and contraction of the anode active material layer along a plane of the surface.

2. A battery according to claim 1, wherein the mesh structure is an anode collector.

3. A battery according to claim 1, wherein the surface of the anode active material layer includes projections which coincide with openings in the mesh structure that is compressed into the surface.

4. A battery according to claim 3, wherein the mesh structure is a wire screen.

5. A battery according to claim 1, 2 or 3, further comprising a foil member layer.

6. A battery according to claim 5, wherein the mesh structure is a wire screen.

7. A battery according to claim 5, wherein the foil member layer is positioned between the anode active material layer and the mesh structure.

8. A battery according to claim 7, wherein the mesh structure is a wire screen.

* * * * *